May 29, 1923.
C. F. SMITH
1,457,007
PEELING MACHINE
Filed April 14, 1923
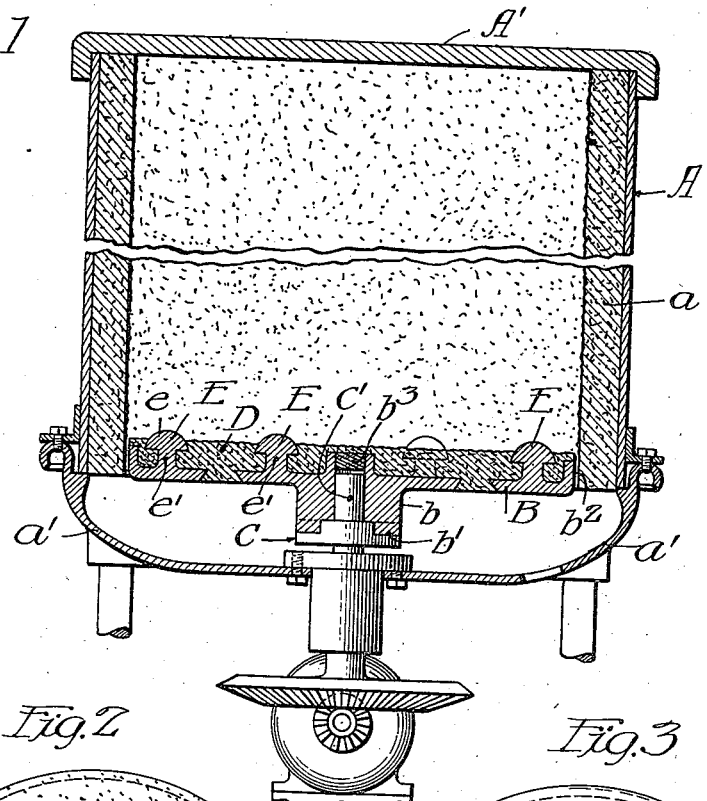
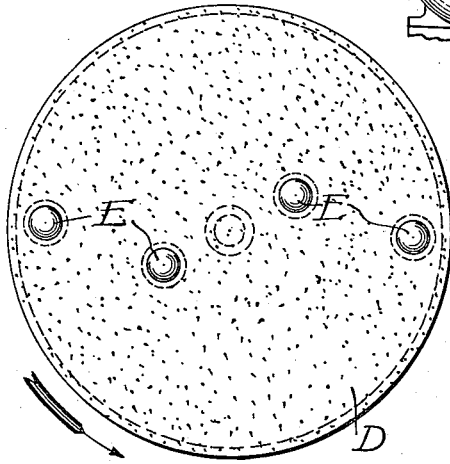
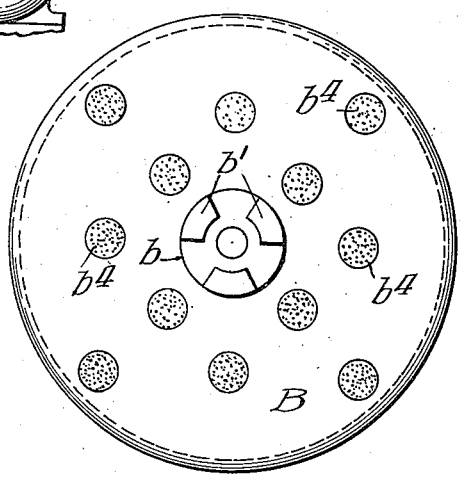
Inventor:
Charles F. Smith,
By Fisher Towle Clapp & Soans
Attys.

Patented May 29, 1923.

1,457,007

UNITED STATES PATENT OFFICE.

CHARLES F. SMITH, OF CHICAGO, ILLINOIS.

PEELING MACHINE.

Application filed April 14, 1923. Serial No. 631,997.

*To all whom it may concern:*

Be it known that I, CHARLES F. SMITH, a citizen of the United States, residing at Chicago, in the county of Cook and State of Illinois, have invented certain new and useful Improvements in Peeling Machines, of which I do declare the following to be a full, clear, and exact description, reference being had to the accompanying drawings, forming a part of this specification.

The improvements comprising my present invention relates more particularly to that type of machines designed for the peeling of potatoes and other vegetables, in which the receptacle for holding the vegetables to be peeled is provided at its bottom with a revoluble disk whereon the mass of vegetables rests, the upper surface of the disk and the interior wall of the receptacle being provided with abrasive surfaces whereby the skins of the vegetables are scoured or removed therefrom.

The object of my invention is to increase the efficiency and output of this type of machines, and the invention consists in the various novel features of construction hereinafter described, illustrated in the accompanying drawing and particularly defined in the claims at the end of this specification.

Figure 1 is a view in central vertical section through a potato peeling machine embodying my invention. Figure 2 is a detail plan view of my improved abrasive disk. Figure 3 is an inverted plan view of the disk.

A designates the receptacle or container for the vegetables and may be of any suitable construction, such, for example, as that set forth in Letters Patent No. 1,384,356, granted to the Maxim Manufacturing Company July 12, 1921. As shown, this receptacle A is provided with a lining $a$ of abrasive material, such as carborundum, cement or the like, and the receptacle will be provided with a suitable cover, as A'. The receptacle A is mounted upon a bottom bowl $a'$ that will be provided with an opening to permit the water, etc., to pass therethrough.

Within the receptacle A is mounted my improved abrasive disk, the details of the construction of which will next be described, although I wish it understood that the invention is not restricted to such details except as specifically stated in the claims at the end of this specification.

In the preferred embodiment of my invention, my improved disk comprises a cast metal plate B having a hub $b$. As shown, the hub $b$ is formed with teeth $b'$ adapted to engage corresponding teeth upon the upper surface of a plate C fixed upon the shaft C', by means of which rotation is imparted to the disk. Any suitable means may be used for imparting rotation to the disk but the disk is preferably so connected with its driving mechanism that the disk can be readily removed from the receptacle when desired.

Preferably, the disk B is formed at its periphery with an upstanding flange $b^2$ and adjacent its center with an annular flange $b^3$, the disk thus forming a pan-shaped receptacle to contain a layer D of carborundum, cement or like material that constitutes the abrasive surface of the disk. The disk B is formed with perforations $b^4$ into which the carborundum or the like will flow, to better hold the material in place upon the disk. The space within the annular flange $b^3$ is preferably filled with babbitt or like material, to better support the layer of abrasive material immediately above it. This abrasive material D will be placed upon the disk while in plastic condition and will be allowed to harden thereon. From the upper surface of the disk B rise the parts E in suitable number and arrangement, these parts preferably comprising studs having expanded and rounded upper surfaces $e$ and having reduced stem portions $e'$. These parts E may be formed integral with the disk B or may be formed of separate parts united to the disk, as in the casting operation. The rounded upper portions $e$ of the parts E extend above the upper surface of the abrasive material D and serve to agitate the mass of vegetables to be peeled. In the preferred form of the invention, also, the parts E, being embedded in the abrasive material D, serve to more effectively retain the material in position upon the disk. The disk B is somewhat smaller in diameter than the interior diameter of the receptacle A so that water and refuse may pass around the periphery of the disk and thence through the perforation in the bowl $a'$, as in prior machines of this type.

When the mass of vegetables to be peeled has been placed within the receptacle and upon the abrasive disk, revolution will be imparted to the disk and as the disk is thus revolved, the smooth rounded upper portions of the parts E, projecting as they do above the surface of the abrasive material, will cause the agitation of the vegetables, while the revolution of the disk will tend to throw them towards the abrasive inner wall or lining *a* of the receptacle. Inasmuch as the upper surface of the parts E are smooth and rounded, they can not unduly cut or hackle the vegetables, while at the same time they effectively agitate the same and secure a uniform and even removal of the skins therefrom. with the least possible waste.

I am aware that it has heretofore been proposed to form abrasive disks of peeling machines with raised humps for agitating the vegetables to be peeled, but prior to my present invention these humps have been roughened or striated, with the result that they unduly cut or hackle the surface of the vegetables. I believe that my present invention presents the first instance of a disk having a surface adapted to remove the skins or cuticles from the vegetables and having one or more smooth elevated portions to effect the turning or agitation of the vegetables. So far as I am aware also, my invention presents the first instance of a disk having a layer of abrasive material with projections embedded in the abrasive material and serving to more effectively retain the same position upon the disk.

I prefer to arrange the raised parts E in the relative positions upon the disk illustrated in Fig. 2 of the drawing, as with this arrangement the parts E have a tendency to move the vegetables towards the wall of the receptacle A and there subject them to the abrasive action of the lining of this wall. To effect this action of moving the vegetables towards the wall as the disk is rotated in the direction of the arrow Fig. 2, the inner raised parts or studs E will be arranged in advance of the radial lines drawn between the outermost parts or studs E and the center of the disk B. Manifestly, however, this arrangement of the parts E may be varied and the number of the raised parts may also be varied, without departing from the spirit of the invention.

What I claim as new and desire to secure by Letters Patent is:—

1. A peeling machine comprising a receptacle for articles to be peeled and a revoluble disk having an abrasive surface and having a relatively non-abrasive part extending above said abrasive surface and adapted to agitate the articles to be peeled.

2. A peeling machine comprising a receptacle for the articles to be peeled and having at its bottom a revoluble disk the top of which is formed in part of an abrasive surface and in part of a raised non-abrasive surface extending above said abrasive surface and adapted to agitate the articles to be peeled.

3. A peeling machine comprising a receptacle having its interior provided with an abrasive surface and a disk at the bottom of said receptacle having upon its upper surface a layer of abrasive material and having retaining members extending upward from the disk and embedded in said abrasive material.

4. An abrasive disk for peeling machines the face of which is formed in part of an abrasive surface and in part of an offset non-abrasive surface.

5. An abrasive disk for peeling machines comprising a metal plate having a plurality of outwardly projecting members and having a layer of abrasive material wherein said members are embedded.

6. An abrasive disk for peeling machines comprising a metal plate having a plurality of outwardly projecting members with expanded upper portions and having a layer of abrasive material wherein said members are embedded.

7. An abrasive disk for peeling machines comprising a metal plate having a layer of abrasive material thereon and a plurality of upwardly projecting members with convex portions extending above the surface of said abrasive material.

8. An abrasive disk for peeling machines comprising a plate, studs projecting from said plate and having rounded outer ends and a layer of abrasive material mounted upon said plate and surrounding said studs.

9. A disk for peeling machines comprising a metal plate, studs projecting upwardly from said plate and having expanded upper portions and a layer of abrasive material wherein said studs are embedded, the upper portion of said studs projecting beyond the surface of said abrasive material.

10. An abrasive disk for peeling machines comprising a metal plate having its upper surface provided with a layer of abrasive material and having a smooth metal part extending from said disk to a distance above the surface of said abrasive material.

CHARLES F. SMITH.